(12) United States Patent
Kirk et al.

(10) Patent No.: US 10,515,119 B2
(45) Date of Patent: Dec. 24, 2019

(54) SEQUENTIAL RECOMMENDER SYSTEM FOR VIRTUALIZED NETWORK SERVICES

(71) Applicant: AT&T Intellectual Property I, L.P., Atlanta, GA (US)

(72) Inventors: Thomas Kirk, Califon, NJ (US); Rittwik Jana, Montville, NJ (US); Mazin E. Gilbert, Warren, NJ (US); John F. Murray, Denville, NJ (US); Tan Xu, Branchburg, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 416 days.

(21) Appl. No.: 14/970,270

(22) Filed: Dec. 15, 2015

(65) Prior Publication Data
US 2017/0168690 A1 Jun. 15, 2017

(51) Int. Cl.
| | |
|---|---|
| G06F 17/30 | (2006.01) |
| G06F 21/00 | (2013.01) |
| G06F 9/455 | (2018.01) |
| H04L 12/26 | (2006.01) |
| G06F 16/9032 | (2019.01) |
| H04L 29/08 | (2006.01) |
| G06F 16/2457 | (2019.01) |
| G06F 3/0484 | (2013.01) |

(52) U.S. Cl.
CPC .... *G06F 16/90324* (2019.01); *G06F 3/04842* (2013.01); *G06F 16/24578* (2019.01); *H04L 67/02* (2013.01)

(58) Field of Classification Search
CPC ............. G06Q 30/02; G06F 17/30867; G06F 17/30011
See application file for complete search history.

(56) References Cited

U.S. PATENT DOCUMENTS

| | | | |
|---|---|---|---|
| 6,006,225 A | 12/1999 | Bowman et al. | |
| 7,660,266 B2 | 2/2010 | Ishida et al. | |
| 8,396,788 B2 * | 3/2013 | Anke ................... | G06F 9/5027 705/38 |
| 8,649,270 B2 | 2/2014 | Fidler | |
| 8,683,464 B2 | 3/2014 | Rozee et al. | |
| 8,787,553 B2 | 7/2014 | Fan et al. | |

(Continued)

OTHER PUBLICATIONS

Zhang et al., "An Ontology-based System for Cloud Infrastructure Services' Discovery," 2012 8th International Conference on Collaborative Computing: Networking Applications and Worksharing (CollaborateCom), 2012, IEEE.

(Continued)

*Primary Examiner* — Jordany Nunez
(74) *Attorney, Agent, or Firm* — Hartman & Citrin LLC

(57) ABSTRACT

Concepts and technologies disclosed herein are directed to a sequential recommender system for virtualized network services. According to one aspect disclosed herein, a recommender system can receive user input regarding a service project interest expressed by a user. In response to the user input, the recommender system can consult a knowledge base to determine a recommended service based upon the user input regarding the service project interest expressed by the user. The recommender system can then present the recommended service to the user.

20 Claims, 9 Drawing Sheets

(56) References Cited

U.S. PATENT DOCUMENTS

| | | | |
|---|---|---|---|
| 8,942,998 B2* | 1/2015 | Thomas | G06Q 30/02 |
| | | | 370/229 |
| 9,036,805 B2 | 5/2015 | Fan et al. | |
| 10,127,587 B2* | 11/2018 | Aftab | G06Q 30/0609 |
| 2008/0059422 A1* | 3/2008 | Tenni | G06F 17/30029 |
| 2008/0306798 A1* | 12/2008 | Anke | G06F 8/61 |
| | | | 705/7.26 |
| 2009/0177697 A1* | 7/2009 | Gao | G06F 16/24539 |
| 2009/0276331 A1 | 11/2009 | Sun et al. | |
| 2011/0320482 A1* | 12/2011 | Barbieri | G06F 17/30867 |
| | | | 707/769 |
| 2013/0263079 A1* | 10/2013 | Schiessl | G06Q 30/02 |
| | | | 717/101 |
| 2014/0229607 A1* | 8/2014 | Jung | H04L 43/0876 |
| | | | 709/224 |
| 2015/0058459 A1 | 2/2015 | Amendjian et al. | |
| 2016/0057246 A1* | 2/2016 | Krishnaiahsetty | G06Q 50/01 |
| | | | 709/204 |
| 2017/0053022 A1* | 2/2017 | Chan | G06F 17/30241 |
| 2017/0124614 A1* | 5/2017 | Aftab | G06Q 30/0609 |
| 2019/0158361 A1* | 5/2019 | Blasi | H04L 41/14 |

OTHER PUBLICATIONS

Badidi, Elarbi, "A Framework for Software-as-a-Service Selection and Provisioning," International Journal of Computer Networks & Communications (IJCNC), May 2013, pp. 189-200, vol. 5, No. 3.

Wittern et al., "Service feature modeling: modeling and participatory ranking of service design alternatives," Software and Systems Modeling, May 23, 2014.

Vrcek et al., "Prerequisites for Successful Implementation of Service-Oriented Architecture," Proceedings of the ITI 2009 31$^{st}$ International Conference on Information Technology Interfaces, Jul. 2009, IEEE.

Badidi et al., "A Cloud-based Approach for Context Information Provisioning," World of Computer Science and Information Technology Journal (WCSIT), 2011, pp. 63-70, vol. 1, No. 3.

* cited by examiner

SEQUENTIAL RECOMMENDER SYSTEM FOR VIRTUALIZED NETWORK SERVICES

BACKGROUND

Software-defined networking ("SDN") is an architectural framework for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits. SDN can allow for the creation of multiple virtual network control planes on common hardware. SDN can help extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

User-defined, on-demand cloud services and user digital experience expectations are driving planning and deployment of network functional virtualization and service-centric SDN among global telecommunications service providers. Network Virtualization Platforms ("NVPs") are deployed in information technology ("IT") data centers, network central offices, and other network points of presence ("POPs") to accelerate deployment of on-demand user service and virtualized network functions. An NVP is a shared virtualized infrastructure that supports multiple services and network applications (including real-time and non-real-time applications).

Combining SDN and NVP functionality, such as in Domain 2.0, available from AT&T, provides a highly complex and dynamic set of relationships between virtual, logical, and physical resources. Networks, such as embodied in Domain 2.0, provide intelligent software systems and applications operating on general purpose commodity hardware. This will not only drive down capital expenditure, ongoing operational costs, and help to configure a network with less human intervention, but will also create significant opportunities to scale and monetize existing and new intelligent services. This will enable networks to establish a new services ecosystem equivalent in concept to the application ecosystems adopted by mobile device application marketplaces provided, for example, by APPLE and GOOGLE in the IOS and ANDROID ecosystems. Moreover, such networks will facilitate mass marketing of existing and new services, and lower the barrier to entry for enterprise and small business customers to create new innovative services.

SUMMARY

Concepts and technologies disclosed herein are directed to a sequential recommender system for virtualized network services. According to one aspect disclosed herein, a recommender system can receive user input regarding a service project interest expressed by a user. In response to the user input, the recommender system can consult a knowledge base to determine a recommended service based upon the user input regarding the service project interest expressed by the user. The recommender system can then present the recommended service to the user.

In some embodiments, the recommender system presents a graphical user interface ("GUI") through which the user can provide the user input. The GUI also can present the recommended service to the user. The GUI, in some embodiments, can be provided, at least in part, as a browser-based GUI, although implementations through dedicated mobile or desktop applications that are configured to communicate with the recommender system are contemplated and disclosed herein.

In some embodiments, the recommender system, in response to the user input, can consult the knowledge base to determine a plurality of recommended services based upon the user input regarding the service project interest expressed by the user. The plurality of recommend services can include the recommended service mentioned above and one or more additional services that can be combined to form a composite service to support the service project interest expressed by the user.

In some embodiments, the recommender system can assign a recommendation score to each of the plurality of recommended services identified through the consultation with the knowledge base. The recommender system can rank the plurality of recommended services in accordance with the recommendation scores assigned thereto. The recommender system can generate a ranked list that includes the plurality of recommended services ranked based upon the recommendation scores. The recommender system can present the ranked list to the user via the recommender GUI.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to a sequential recommender system for virtualized network services. The concepts and technologies disclosed herein provide, at least in part, an overview of how intelligent services can be realized within the Domain 2.0 or similar architecture. An intelligent service can collect information about resources (e.g., users, devices, networks, and applications) used to deliver the service and information about the environment in which the service operates. The service can then make decisions based on this information and domain knowledge, which includes adapting and personalizing the service for the users that consume the service. An intelligent service can receive feedback based on performance thereof and can learn through machine learning processes. There are primarily three attributes that characterize an intelligent service—personalized, adaptive, and dynamic. A predictive personalized service is one that anticipates a user's need, proactively takes intelligent actions, and recommends valuable and timely personalized information. An adaptive service learns from past actions of all users and adjusts behavior to provide superior service quality. A service that is dynamic is one that is robust and is able to survive and self-repair or self-organize from possible service interruptions.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
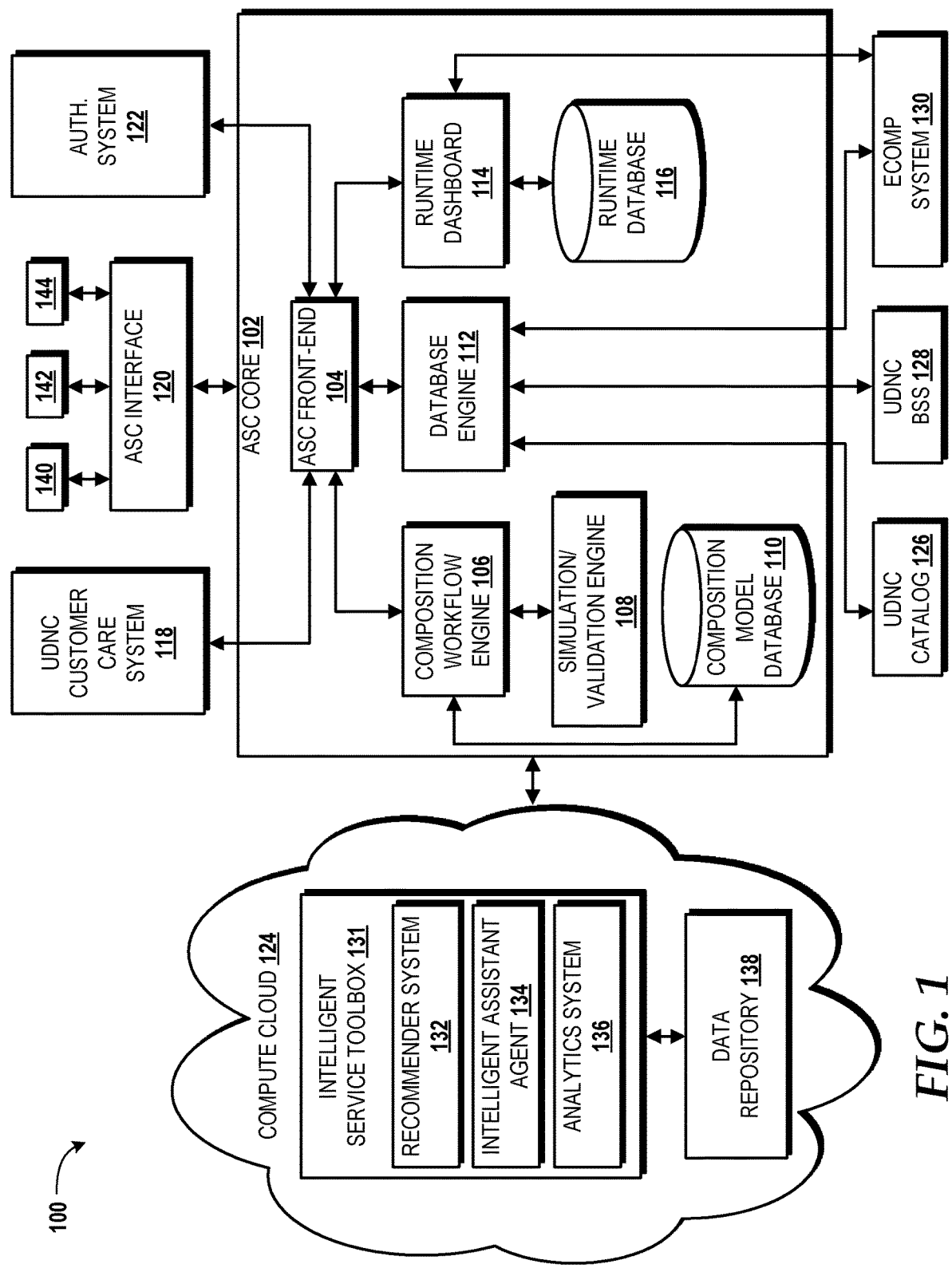
FIG. 1 is a block diagram illustrating aspects of an illustrative autonomous services composition ("ASC"), according to an illustrative embodiment.

While connections are shown between some of the components illustrated in FIG. 1, it should be understood that some, none, or all of the components illustrated in FIG. 1 can be configured to interact with one another to carry out various functions described herein. Thus, it should be understood that FIG. 1 and the following description are intended to provide a general understanding of a suitable environment in which various aspects of embodiments can be implemented, and should not be construed as being limiting in any way.

Referring now to FIG. 1, aspects of an autonomous services composition ("ASC") architecture 100 for implementing various embodiments of the concepts and technologies disclosed herein will be described. The ASC architecture 100 functions as a services marketplace to provide a holistic customer experience to create novel services by leveraging advanced tools such as recommenders and expert systems, real-time customer care collaboration, and big data analytics. Service composition is a mechanism for integrating applications/services from predefined component modules (e.g., resources) and deploying these modules where and when the modules are needed. Moreover, service composition is the service linking capability that provides a mechanism for defining new applications, managing application lifecycles, and implementing elastic services in a cloud computing environment. By rapidly integrating components and sizing those components dynamically, applications can be built to handle varying user loads. By selectively deploying component modules based upon affinity rules, multiple time-critical functions can be directed to share common infrastructure to minimize latency, while high availability can be maintained by directing redundant components to execute on geographically separated servers.

By way of example and not limitation, consider a set of basic services, including data connectivity between two endpoints (e.g., switched Ethernet service like GAMMA); a data "splitter" service that takes data from an endpoint and sends the data to two or more endpoints; an anomaly detection service that detects anomalies and sends alarms to an endpoint upon detection thereof; and a data archiving service. In this example, a small-town bank with a video surveillance camera in the lobby might want to send a video stream captured by the video surveillance camera to a home office while the banker is away from the bank. To implement this feature, the ASC architecture 100 can be used to configure a basic connectivity service with endpoint locations at the bank and the home office. Alternatively, alerts can be sent when something unexpected happens such as a break-in or the like. Through the ASC architecture 100, a video anomaly detection service can be composed by taking the video output from the data splitter service and piping the video output into the anomaly detection service, which can be configured to generate and provide alerts in response to specified anomalies (e.g., detection of an unauthorized person via video surveillance). The video anomaly detection can be further expanded to store the video for a specified period of time as well as receiving the alerts. In all of these cases, the ASC architecture 100 creates individual service orders for the basic services, and the overall application control that shows how the basic services are composed together to form a new service.

There are many challenges that service composition presents. The ASC architecture 100 can utilize items from resource, service, and product catalogs. There is a need to model these network functions virtualization ("NFV") elements before composition can be realized. In some embodiments, the ASC architecture 100 can utilize an extended version of Open Topology and Orchestration Specification for Cloud Applications ("TOSCA") to model these products. This facilitates rapid service composition in a manner that is verifiable at different stages of the software lifecycle. The starting point of composition is a catalog of third party NFV elements. The ASC architecture 100 provides an ecosystem that can bootstrap vendors to populate the resource and service catalogs using TOSCA. TOSCA is available from Organization for the Advancement of Structured Information Standards ("OASIS"). OASIS TOSCA is a cloud computing standard, additional details of which are readily available and therefore not provided herein. Those skilled in the art will appreciate the applicability of other cloud computing technologies to the concepts and technologies disclosed herein.

The ASC architecture 100 enables rapid iterative development, an elastic scaling path as utilization grows, and flexibility in terms of evolving requirements and addition of new functionality. The subsystems of the ASC architecture 100 are designed around a micro service architecture, in which components interoperate via a lightweight distributed message bus. In some embodiments, the lightweight distributed message bus is implemented via VERT.X. The carefully abstracted messaging pub/sub interface facilitates extensibility (e.g., via additional of semantic assistants). Finally, the ASC architecture 100 can easily scale horizontally to meet elastic demand—subsystem replicas can be deployed in seconds on lightweight containers as utilization requires.

Composition is ultimately a complex data-driven process, using not only an extensive product catalog and asset inventory, but also representations of the domain expertise that goes into building complex composite services. Composition can utilize graph database technology to allow natural ways to represent the semantic connections among catalog and inventory items, workflow state, and related domain knowledge. The database is dynamically extensible to accommodate learning throughout the lifecycle, and is continuously available to intelligent agents overseeing and augmenting the composition process.

The ASC architecture 100 can execute composed orders in a Domain 2.0 or similar environment. The ASC architecture 100 can provide a "shopping cart" like experience that provides an end customer with the ability to discover, create, deploy, and watch a service. The ASC architecture 100 can interoperate with a Service Design and Creation ("SD&C") subsystem to fulfill service orders. The ASC architecture 100 also can communicate with a range of Domain 2.0 entities, including, for example, a data collection, analysis, and event ("DCAE") engine in enhanced control, orchestration, management, and policy ("ECOMP"), and an active and available inventory ("A&AI") for real-time asset information to monitor the service and present real-time reports in a dashboard using analytics and visualization tools.

A part of the composition process is to allow the customer to discover services and products that are related. An expert system is utilized to suggest or recommend compatible products to guide successful compositions. Another feature of the ASC architecture 100 is designing for collaboration due, at least in part, to the complexity of service development, which often involves many participants. For this reason, the ASC architecture 100 is designed to be a collaborative workspace from the start. Another aspect of composition of services is the complexity and richness of the workflow. For this reason, the ASC architecture 100 provides seamless support during the service composition lifecycle. To make the ASC architecture 100 maximally accessible, a graphical user interface ("GUI") is provided. In some embodiments, the GUI is completely browser-based, leveraging hypertext markup language ("HTML") 5 technologies such as web graphics library ("WEBGL") and web real-time communication ("WEBRTC") to enable a powerful and effective user experience. In these embodiments, the ASC architecture 100 also can provide a WEBRTC-based collaboration environment for customer care needs before, during, and after service deployment.

The illustrated ASC architecture 100 includes an ASC core 102 that, in turn, includes an ASC front-end 104 (also referred to herein as a "service creation editor"), a composition workflow engine 106, a simulation/validation engine 108, a composition model database 110, a database engine 112, a runtime dashboard 114, and a runtime database 116. The composition workflow engine 106 manages the state (also referred to herein as "phase") of a service composition during the service design process. The composition workflow engine 106 works in conjunction with the ASC front-end/service creation editor 104 and the composition model database 110. The composition workflow engine 106 can provide a design interface that allows users to search and select service models from the composition model database 110 to be added to the composition. The composition workflow engine 106 can provide an editor interface that displays these models graphically as components with clearly-defined interface connection points to guide users in assembling a valid service topology. The process of service creation proceeds by connecting the underlying service components into a graph, as well as editing modifiable properties on nodes and relationships among the nodes. At each step of this process, the composition workflow engine 106 can maintain a state of the composition graph. The state can be passed to the simulation/validation engine 108, which can check for correctness and completeness of the composition. That is, the simulation/validation engine 108 can determine whether the composition is a well-formed and deployable service.

The ASC core 102 is illustrated as being in communication with a user-defined network cloud ("UDNC") customer care system 118, an ASC interface 120, an authentication system 122, a compute cloud 124, a UDNC catalog 126, a UDNC BSS 128, and an ECOMP system 130. The compute cloud 124 includes an intelligent service toolbox 131 that, in turn, includes a recommender system 132, an intelligent assistant agent 134, and an analytics system 136. The intelligent service toolbox 131 is in communication with a data repository 138.

The ASC core 102 can be built around a message-based bus architecture that enables the ASC core 102 components to communicate with the intelligent service toolbox 131, and particularly, the intelligent assistant agent 134, to inspect arbitrary operations within the ASC architecture 100. For example, the intelligent assistant agent 134 can follow a user's service creation workflow and can make suggestions and/or automate workflow tasks based upon design domain expertise encoded in the intelligent assistant agent 134. The analytics system 136 can utilize accumulated workflow data from previous service creation sessions to derive new ways to guide user activity. This data can be stored in the data repository 138.

The ASC front-end 104 can access the ACS core 102 via the ASC interface 120. In particular, users can access the ASC core 102 using an HTML 5-compliant web browser 140, a mobile application 142, or a standalone desktop application 144. The user interface ("UI") layer can be implemented using open source standards-compliant software, such as, for example, THREE.JS, WEBGL, CSS3D WEBRTC toolkits, or some combination thereof. The graphics environment can be presented as a collaborative three-dimensional ("3D") environment. In later phases of a workflow (an example of which is described herein below with reference to FIG. 2), the ASC interface 120 can connect with an electronic business platform (not shown) by standard web technologies (e.g., HTML5). A set of requirements can be provided to the electronic business platform for integration.

The ASC front-end 104 provides the UDNC customer care system 118 and the authentication system 122 access to the ASC front-end 104. The ASC core 102 can utilize customer care functionality provided by the UDNC customer care system 118 using HTML5, specifically WEBRTC technologies. Any collaboration activity (e.g., virtual agent or co-designers) in the ASC core 102 can utilize WEBRTC technologies. The ASC core 102 also can use standard lightweight directory access protocol ("LDAP")

and security assertion markup language ("SAML") queries, and/or the like, against the authentication system 122 for customer authentication.

The customer interaction with the ASC front-end 104 is greatly enhanced by the included WEBRTC functionality. Implemented as a core function of the ASC architecture 100, WEBRTC provides a rich source of customizable customer care utilities. With WEBRTC functions in the web and mobility interfaces, customers can interact with the UDNC customer care system 118 in an on-demand, multi-channel connection. The UDNS customer care system 118 can support real-time chat, audio and video communications, as well as recording, with instant playback. Depending upon the exact service scenario, presence data and other data streams can be combined to make customer-facing applications precisely fit the customer needs. For example, care agents could share data streams, stored video, view the results of queries with the customer in a co-browsing environment designed to collaboratively solve problems or co-design service compositions. WEBRTC also can be used to create adhoc communities. For example, a specialist in a particular problem could be invited into a customer care session and can be instantly provided with the data views and relevant information needed to provide customer service. Authentication in the ASC architecture 100 can be tailored to a role; access to capabilities or information for a customer, customer care agents, supervisors, and/or administrators, for example, can depend upon one or more policies defining that role.

Figure 2:
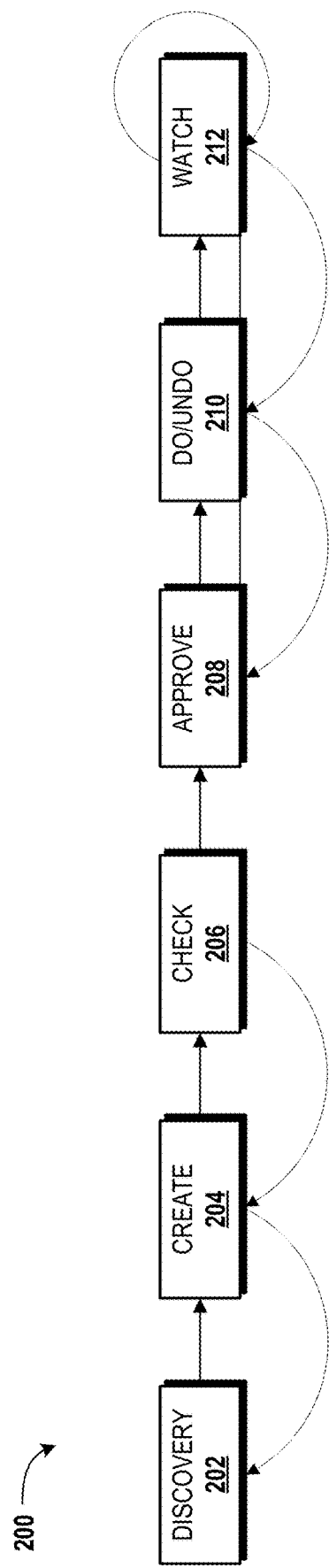
FIG. 2 is a block diagram illustrating aspects of workflow for service creation and design, according to an illustrative embodiment.

Referring now, briefly, to FIG. 2 along with FIG. 1, a block diagram illustrating aspects of a workflow 200 implemented by the ASC core 102 via the composition workflow engine 106 for service creation and design will be described, according to an illustrative embodiment. The composition workflow engine 106 performs composition model management. The composition workflow engine 106 stores, in the composition model database 110, the various workflows/scenarios that a customer is designing and presents a service palette that a user can utilize to create new services. The composition model database 110 can allow customers to link different components from the UDNC catalog 126, which includes resource/service/product offerings. The composition model database 110 is internal to the ASC core 102 and is used for the stateful management of the workflow 200.

The composition workflow engine 106 can execute one or more software modules that provide the workflow 200. The illustrated workflow 200 includes a discovery workflow phase ("discovery") 202, a create workflow phase ("create") 204, a check workflow phase ("check") 206, an approve workflow phase ("approve") 208, a do/undo 210 workflow phase ("do/undo"), and a watch 212 workflow phase ("watch").

The workflow 200 begins with a discover workflow phase 202. During the discover workflow phase 202, users can be prompted to conceptualize a service. In particular, the discover workflow phase 202 can allow users to perform search queries, question and answer sessions, engage with virtual agents/customer care via the UDNC customer care system 118, and facilitate collaboration with other designers.

The create workflow phase 204 allows users to design and estimate the cost of the service concept. During the create workflow phase 204, users are presented with a service palette through which they can choose one or more services from the UDNC catalog 126. The composition workflow engine 106 can utilize items from the UDNC catalog 126 to create unique composition scenarios. Resource and service items can also be placed in the UDNC catalog 126 for selection by a customer. For example, a data resource (e.g., network event location system or WIFI session data) can be included in the UDNC catalog 126 for composition purposes. The validity of product interconnections can be verified by the simulation/validation engine 108. The UDNC catalog 126 can be accessed by the database engine 112 using a set of RESTFUL application programming interfaces ("APIs"). Requirements can be provided to the UDNC catalog 126 for inserting additional metadata that describe product interconnections. Each resource/service/product item can be modeled using OASIS TOSCA. In this manner, a template for describing relationships between the various service building blocks is provided.

The workflow 200 then moves to the check workflow phase 206 during which users can question, study, validate, and simulate the various workflows that they have created via the simulation/validation engine 108. The simulation environment provided by the simulation/validation engine 108 can include a faithful representation of the various composed services. The check workflow phase 206 also allows users to study different aspects of the design (e.g., scalability, service performance, and the like). The simulation/validation engine 108 is responsible for validating service scenarios ahead of deployment. The simulation/validation engine 108 highlights various performance or scalability indicators. The simulation/validation engine 108 is also able to verify if certain compositions can indeed be linked together. The interface checking between different service components is one step in assuring the customer that a particular service design is feasible. The simulation/validation engine 108 builds on open source models of virtual networking functions ("VNFs") and enhances these models to provide an end-to-end service. An example of the simulation/validation engine 108 is MININET, available from http://mininet.org/. Network level simulations can be performed using MININET, OPNET, or similar simulation software. The simulation/validation engine 108 might have external connections to a UDNC simulator (not shown); for example, via a RESTFUL API. The UDNC simulator can focus on lower level network simulations whereas simulation/validation engine 108 can focus higher level service interactions.

Once a user is satisfied with the simulation results, the workflow 200 proceeds to the approve workflow phase 208 during which any approvals and/or funding/resources are requested. The do/undo workflow phase 210 takes the generated workflows and instructs an orchestrator to realize an instance of the service. This is facilitated by the ECOMP system 130 whereby the orchestrator instructs lower level network components to allocate resources for fulfilling the service. The user can also undo certain steps of the service and approvals will need to be requested. Finally, when the service is deployed the user can monitor execution of the service during the watch phase 212. The workflow 200 is iterative and the user can change his or her design at any point.

An example to illustrate the workflow 200 is the creation of a network-on-demand ("NoD") service, for which all resources are VNFs, so the workflow 200 can proceed completely under software control. In the discovery phase 202, a combination of guided search and product recommendations based on the user's intentions populate the front-end workspace with a list of catalog items that are potential composition candidates for inclusion in a custom NoD service. The transition to the create phase 204 occurs when a user begins to bring particular service components into the composition (e.g., by dragging a graphical representation of the resource). The check phase 206 can occur at any point during this process, using the composition workflow engine 106 current state representation to verify the validity of the design, and providing user feedback about whether the user has a logically correct composition. In practice, the discovery phase 202, the create phase 204, and the check phase 206 are tightly interleaved. After a user is satisfied with their design and the simulation/validation engine 108 has validated the composition as deployable, the workflow 200 can then move to the approve phase 208, where the user expresses intention to order the service and confirm billing and other service level agreements. At this point the service is deployable, so the do/undo phase 210 provides functionality for instantiating the service and any of the underlying resources on which the service depends; likewise, undo reverses this process, stopping the service and freeing any of the resources on which the service depends. For the NoD example, deployment includes instantiation of the VMs that will host the VNFs, instantiation of the VNFs (e.g., virtual gateway, VPN service, and site-specific network endpoints), and establishing virtual network connectivity among the resources. For ongoing deployed services, the watch phase 212 provides means to monitor the status of the service. In the case of NoD, the runtime dashboard 114 can display network connectivity, topology, and performance indicators.

The ASC core 102 interfaces with the ECOMP system 130 to transition approved workflows to the underlying network. An approved workflow can then proceed to the UDNC BSS 128 and OSS (not shown) systems where an order can be placed followed by network deployment. Key performance indicators ("KPIs") regarding the status of real-time network deployments are fed back into the ASC core 102 so that the KPIs can be reported back to the user.

Figure 3:
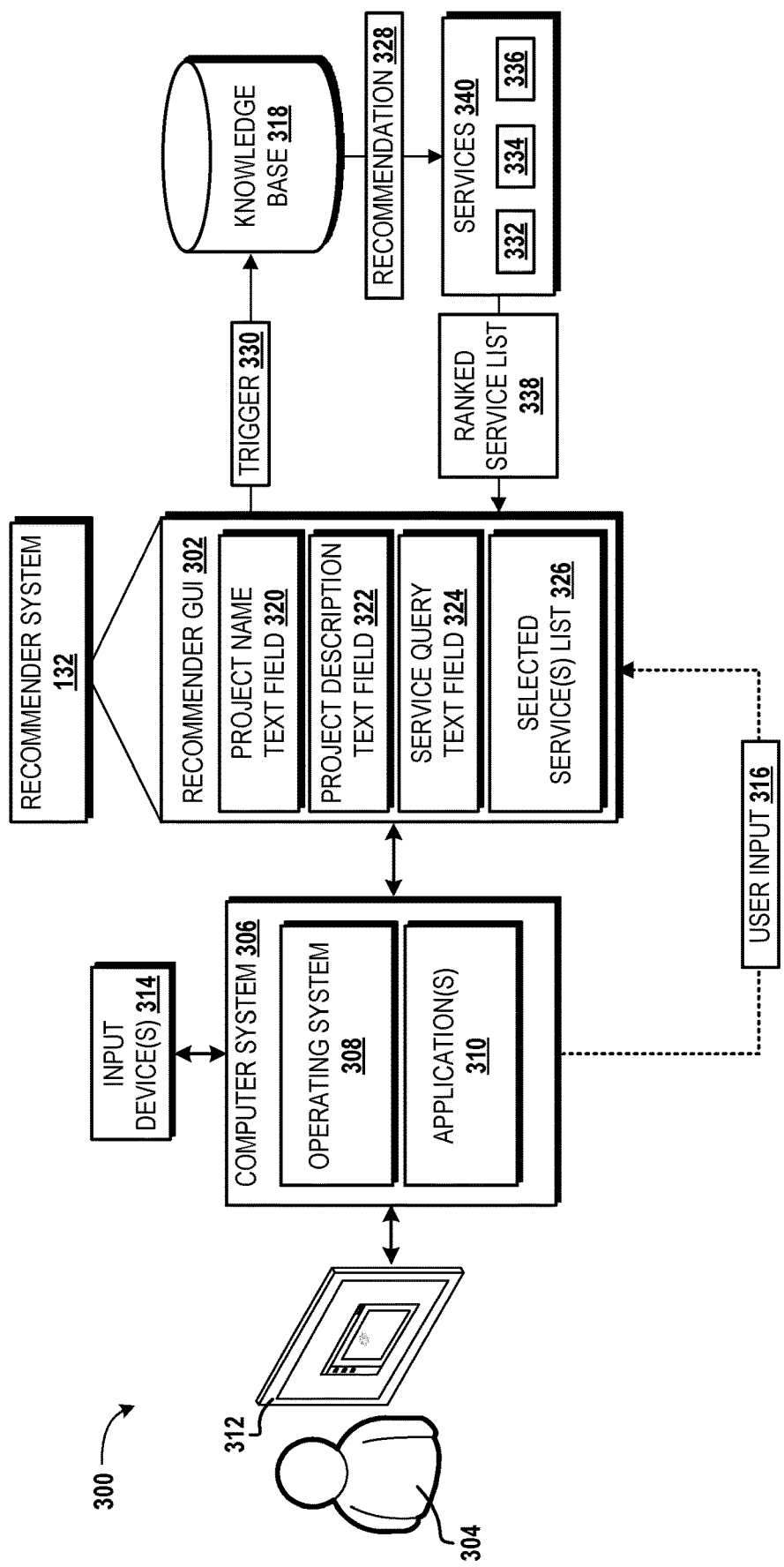
FIG. 3 is a block diagram illustrating aspects of a sequential recommender architecture and procedure, according to an illustrative embodiment.

Referring now to FIG. 3, a block diagram illustrating aspects of an operating environment 300 in which aspects of the concepts and technologies described herein can be implemented, according to an illustrative embodiment will be described. The operating environment 300 includes a recommender GUI 302 provided by the recommender system 132 accessible by a user 304 via a computer system 306. According to various implementations of the concepts and technologies disclosed herein, the computer system 306 can include a user computing device, such as a tablet computing device, a personal computer ("PC"), a desktop computer, a laptop computer, a notebook computer, a cellular phone or smartphone, other mobile computing devices, a personal digital assistant ("PDA"), or the like. Example architectures of the computer system 306 are illustrated and described herein below with reference to FIG. 6.

The computer system 306 can be configured to execute an operating system 308 and one or more application programs 310, such as, for example, the web browser 140, the mobile application 142, the standalone desktop application 144, and/or other application programs. The operating system 308 is a computer program for controlling the operation of the computer system 306. The application programs are executable programs configured to execute on top of the operating system 308.

The illustrated computer system 306 operates in communication with a display 312 and one or more input devices 314. The display 312 can present the recommender GUI 302 to the user 304. The display 312 is an output device configured to present information in a visual form. In some embodiments, the display 312 is a liquid crystal display ("LCD") utilizing any active or passive matrix technology and can utilize any backlighting technology. In some embodiments, the display 312 is an organic light emitting diode ("OLED") display. The display 312 can be embodied with other display technologies. As such, the examples provided above should not be considered limiting in any way. The input device(s) 314 can be or can include one or more touchscreens, one or more multi-touch touchscreens, one or more keyboards, one or more computer mice, one or more game controllers, one or more joysticks, one or more touchpads, one or more gesture devices (e.g., MICROSOFT KINECT, available from MICROSOFT CORPORATION), combinations thereof, or the like. The input device(s) 314 can receive user input 316 from the user 304.

Given a project interest expressed by the user 304, the recommender system 132 can sequentially recommend one or more virtualized services ("services") 316 from a knowledge base 318. Each of the services 316 is an entry in the knowledge base 318 and can be the target of the recommendation 328. The user 304 can express his or her interest via the recommender GUI 302 and, more particularly, through the user input 316 into a project name text field 320, a project description text field 322, a service query text field 324, and a selected service(s) list 326. The selected service(s) list 326 can be empty at the beginning of the recommendation procedure. The recommendation procedure is a sequence of single recommendations (see recommendation 328) starting from when the user 304 initializes a project build and ending when the user 304 terminates the project build either by completing the project build or quitting the project build. Each recommendation 328 is triggered (see trigger 330) in response to the user 304 updating, via the user input 316, the project name text field 320, the project description text field 322, the service query text field 324, the selected service(s) list 326, or some combination thereof.

Each of the services 340 is described in an entry in the knowledge base 318 and can be the target of the recommendation 328. Each entry can include fields such as a name field 332, a description field 334, and an identifier field 336. Entries in the knowledge base 318 additionally or alternatively can include service families, service portfolios, service-related documents, and relationships among one or more entities.

The recommendation 328 result is a ranked list of services ("ranked service list" 338). The ranked service list 338 includes a ranking of a subset of the services 340 according to recommendation scores assigned by the recommender system 132.

Figure 5:
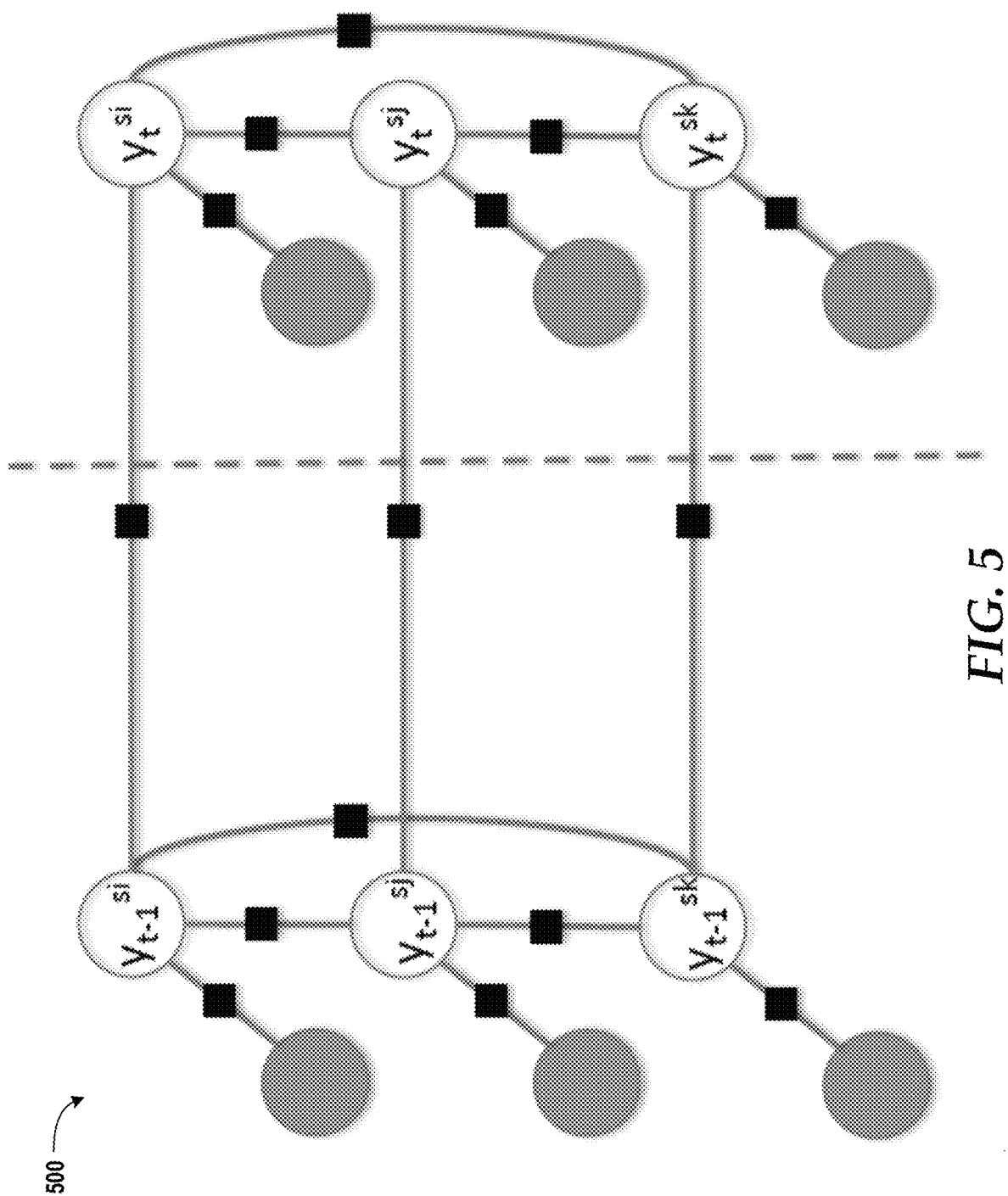
FIG. 5 is a diagram illustrating an illustrative graphic model for dynamic conditional random fields, according to an embodiment.

The recommender system 132 can calculate recommendation score for a service by using a dynamic conditional random fields ("CRF") undirected graphic model. An illustrative example of a graphic model for dynamic CRF is depicted in FIG. 5, and defined by equation:

$$p(y_t \mid x_t) = \frac{1}{Z(x)} \prod_t \prod_c \prod_s \exp\{\vec{\theta}_\alpha^T f^k(y_t^s, \vec{x}_t^s) + \vec{\theta}_c^T f_c^d(y_t^s, y_t^{s'}, \vec{x}_t^s) + \vec{\theta}_\tau^T f_\tau^e(y_t^s, y_{t-1}^s, \vec{x}_t^s)\},$$

where Z(x) is the normalization factor, and defined by equation: $Z(x) = \Sigma_y \Pi_t \Pi_c \Pi_s \exp\{\vec{\theta}_\alpha^T f^k(y_t^s, \vec{x}_t^s) + \vec{\theta}_c^T f_c^d(y_t^s, y_t^{s'}, \vec{x}_t^s) + \vec{\theta}_\tau^T f_\tau^e(y_t^s, y_{t-1}^s, \vec{x}_t^s)\}$. In this equation, t denotes a recommendation step in a recommendation procedure $T = \{t_0, \ldots, t_n\}$, $\vec{x}_t^s$ denotes observable variables for a service s (e.g., uni-gram word vector distance between an examining service's description and the user entered project description, or averaged graph distance measured between an examining service and all the current selected services), and $y_t^s$ denotes prediction for s with a binary value of $\{0,1\}$. Three types of factors are identified in the model: (1) $f^k(y_t^s, \vec{x_t^s})$ denotes k dimensional features calculated for $y_t^s$ from $x_t^s$, and $\vec{\theta_\alpha}$ is a corresponding real-valued parameter vector; (2) $f_c^d(y_t^s, y_t^{s'}, \vec{x_t^s})$ denotes d dimensional features capturing the relationship between an examining service and another service with corresponding parameter vector $\vec{\theta_c}$, which is tied by three clique templates that are defined using cypher declarative graph query language: clique 1 includes services under the same portfolio; clique 2 includes services referenced by the same document; and clique 3 includes services connected by no more than 4-hop of TOSCA models according to the I/O specification. (3) $f_\tau^e(y_t^s, y_{t-1}^s, \vec{x_t^s})$ denotes e dimensional features capturing the sequential dependency of a prediction with its previous recommendation step's predictions. The corresponding parameter vector is $\vec{\theta_\tau}$. Loopy belief propagation can be employed for prediction given observation and computing marginal distribution in the parameter estimation, as well as the normalization function Z(x). For parameter estimation, a conditional log-likelihood $L(\lambda)=\Sigma_i \log p_\lambda(y^i|x^i)$ can be optimized, where $\lambda=\{\vec{\theta_\alpha}, \vec{\theta_c}, \vec{\theta_\tau}\}$, and $(y^i, x^i)$ denotes a training data. To reduce the issue of overfitting in the training procedure, a spherical Gaussian parameter prior can be used with mean equals to 0 and covariance matrix $\Sigma=\sigma^2 I$.

In some embodiments, the recommender system 132 can process time and space as features when making a decision regarding which service(s) to recommend. Time and history of how the user interacted with one or more applications (e.g., a browser) and/or previous interest can be included by the recommender system 132 as part of a recommendation algorithm. In this manner, a trajectory of interactions can be provided over time. This can be beneficial because, unlike single products, a service is made of several resources (which can include multiple individual products) that are chained together. Hence, understanding the interaction history in time helps to provide a more appropriate recommendation at each instance in time.

Figure 4A:
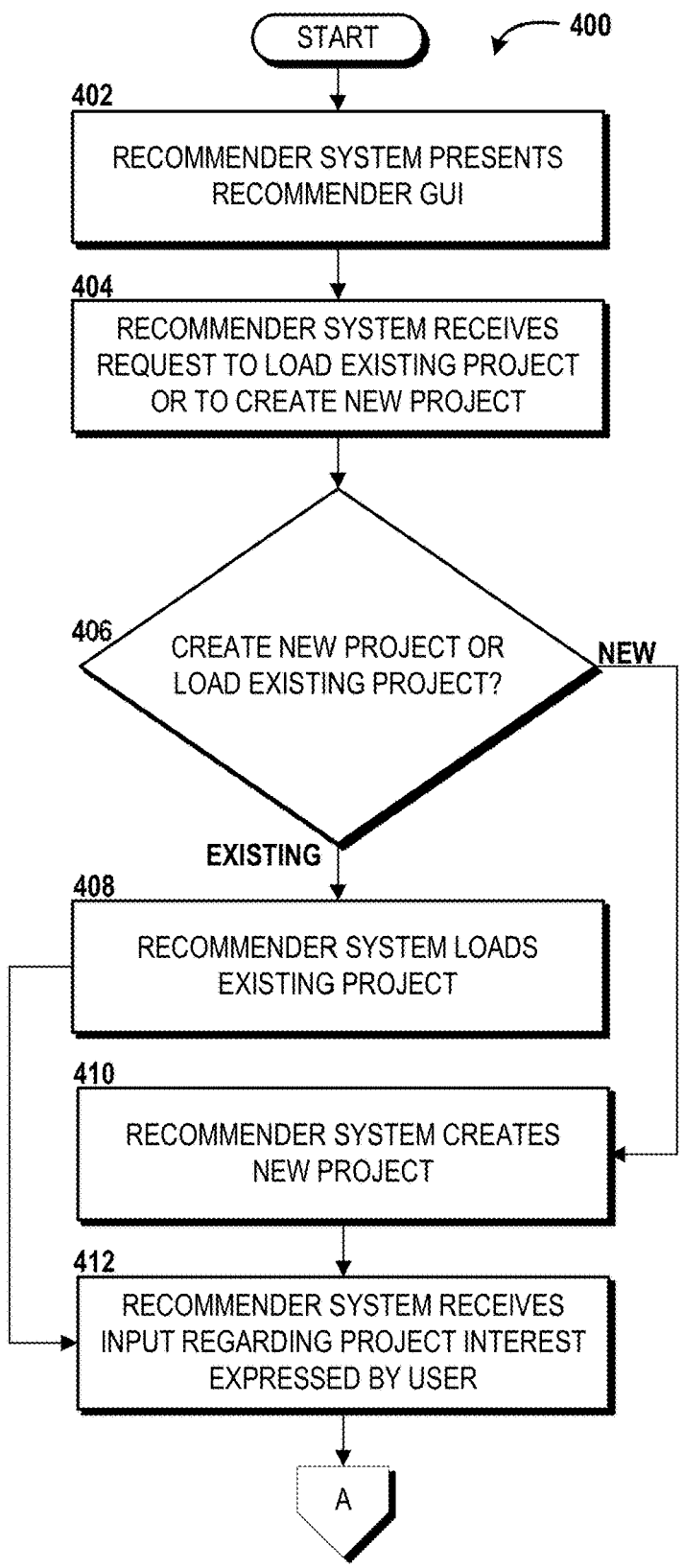
FIGS. 4A-4B are flow diagrams illustrating aspects of a method for sequentially recommending virtualized services, according to an illustrative embodiment.
Figure 4B:
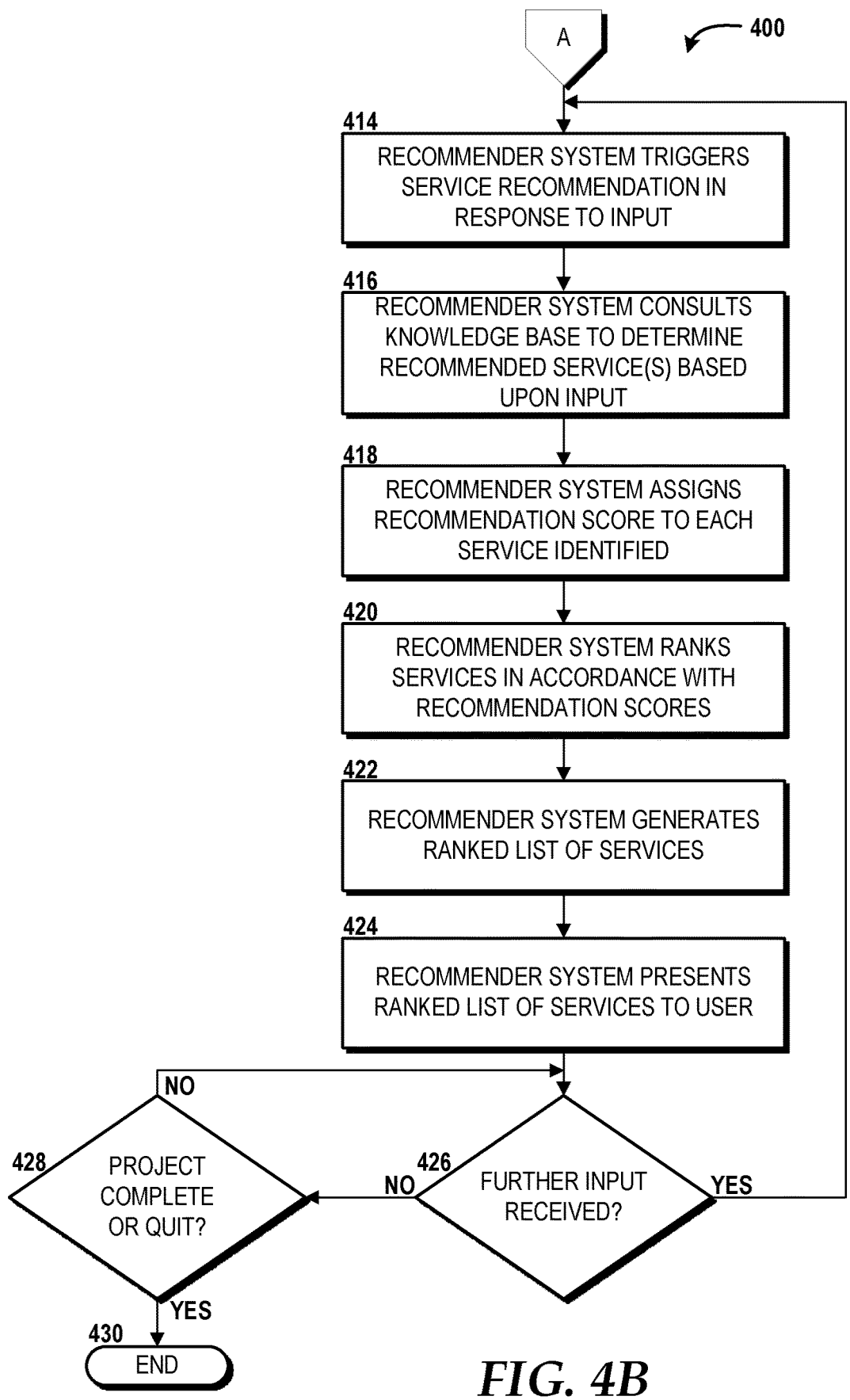

Referring now to FIGS. 4A-4B, is a flow diagrams illustrating aspects of a method 400 for sequentially recommending virtualized services will be described, according to an illustrative embodiment. The method 400 begins and proceeds to operation 402, where the recommender system 132 presents the recommender GUI 302. From operation 402, the method 400 proceeds to operation 404, where the recommender system 132 receives, via the recommender GUI 302, a request to load an existing project or a request to create a new project. From operation 404, the method 400 proceeds to operation 406, where the recommender system 132 determines whether to create a new project or to load an existing project based upon the request received at operation 404. In response to receiving a request to load an existing project, the method 400 proceeds from operation 406 to operation 408, where the recommender system 132 loads an existing project. In response to receiving a request to create a new project, the method 400 proceeds from operation 406 to operation 410, where the recommender system 132 creates a new project. In either case, the method 400 proceeds to operation 412, where the recommender system 132 receives input regarding project interest expressed by the user.

From operation 412, the method 400 proceeds to operation 414 (shown in FIG. 4B), where the recommender system 132 triggers a service recommendation in response to input. From operation 414, the method 400 proceeds to operation 416, where the recommender system 132 consults the knowledge base 318 to determine recommended service (s) based upon the input. From operation 416, the method 400 proceeds to operation 418, where the recommender system 132 assigns a recommendation score to each service identified at operation 416. From operation 418, the method 400 proceeds to operation 420, where the recommender system 132 ranks services in accordance with the recommendation scores calculated by a dynamic CRF model, such as described herein above, that is trained with historical service purchasing data. From operation 420, the method 400 proceeds to operation 422, where the recommender system 132 generates a ranked list of services (e.g., the ranked service list 338) based upon the recommendation scores. The ranked service list 338 can include a list of services listed in order from highest rank (i.e., highest recommendation score) to lowest rank (i.e., lowest recommendation score). Other orders such as lowest to highest, and/or grouping scores ranked with similar scores (e.g., a certain range of scores can be grouped together) can be used.

From operation 422, the method 400 proceeds to operation 424, where the recommender system 132 presents, via the recommender GUI 302, the ranked service list 338 to the user 304. From operation 424, the method 400 proceeds to operation 426, where the recommender system 132 determines whether further input has been received. If the recommender system 132 determines, at operation 426, that further input has been received, such as input to update one or more of the fields 320, 322, 324 and/or the selected service(s) list 326, the method 400 returns to operation 414, and the method 400 proceeds as described above. If, however, the recommender system 132 determines, at operation 426, that further input has not been received, the method 400 proceeds to operation 428, where the recommender system 132 determines whether the user 304 has selected a GUI element to complete or quit the project. If, at operation 428, the recommender system 132 determines that the user has selected a GUI element to complete or quit the project, the method 400 proceeds to operation 430, where the method 400 ends. If, however, at operation 428, the recommender system 132 determines that the user 304 has not selected a GUI element to complete or quit the project, the method 400 returns to operation 426, and the method 400 proceeds as described above.

Turning now to FIG. 5, a diagram illustrating an illustrative graphic model 500 for dynamic CRFs ("dynamic CRF model 500") will be described, according to an embodiment. The dynamic CRF model 500 can be considered a way to blend the linear-chain CRF with a relational CRF model. The dynamic CRF model 500 is a more flexible CRF that is designed for a complicated undirected graphical model whose structure and parameters are repeated over a sequence. For each time step, similar to linear-chain CRF, the dynamic CRF model 500 ties features and parameters between two time steps across the network. In accordance with the concepts and technologies disclosed herein, for tractability consideration, a first-order Markov assumption can be made between recommendation steps, which assumes that with each recommendation step the predications depend only on the previous step's predication. Therefore, the dynamic CRF for the sequential recommendation problem as described above with reference to FIG. 4 can be defined by the dynamic CRF model 500, where the dashed line indicates the boundary of recommendation steps.

Figure 6:
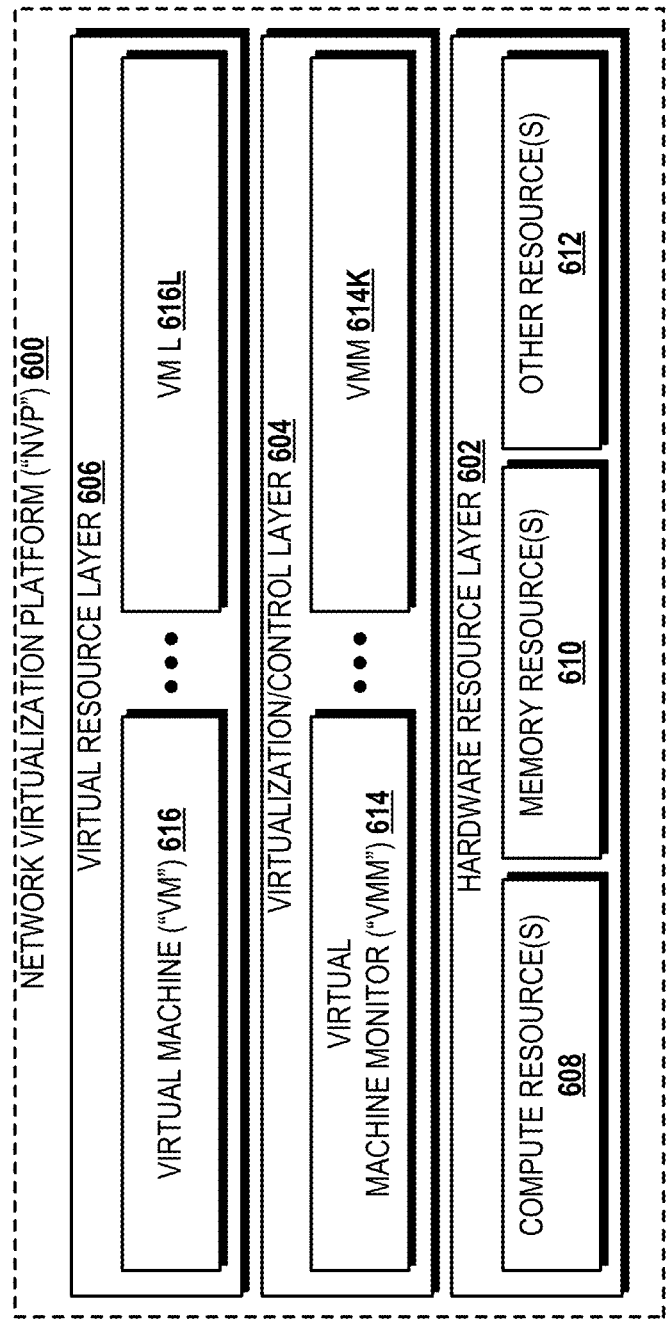
FIG. 6 is a block diagram illustrating an example computer system capable of implementing aspects of the embodiments presented herein.

Turning now to FIG. 6, a block diagram illustrating an illustrative network virtualization platform ("NVP") 600 that can be used to implement, at least in part, the compute cloud 124, or at least a portion thereof, introduced above in FIG. 1 will be described, according to an illustrative embodiment. The illustrated NVP 600 includes a hardware resource layer 602, a virtualization/control layer 604, and a virtual resource layer 606 that work together to perform operations as will be described in detail herein. The hardware resource layer 602 provides hardware resources, which, in the illustrated embodiment, include one or more compute resources 608, one or more memory resources 610, and one or more other resources 612.

The compute resource(s) 608 can include one or more hardware components that perform computations to process data, and/or to execute computer-executable instructions of one or more application programs, operating systems, and/or other software, to provide, at least in part, any services or composition of services described herein. The compute resources 608 can include one or more central processing units ("CPUs") configured with one or more processing cores. The compute resources 608 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 608 can include one or more discrete GPUs. In some other embodiments, the compute resources 608 can include CPU and GPU components that are configured in accordance with a co-processing CPU/GPU computing model, wherein the sequential part of an application executes on the CPU and the computationally-intensive part is accelerated by the GPU. The compute resources 608 can include one or more system-on-chip ("SoC") components along with one or more other components, including, for example, one or more of the memory resources 610, and/or one or more of the other resources 612. In some embodiments, the compute resources 608 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 608 can be or can include one or more hardware components architected in accordance with an ARM architecture, available for license from ARM HOLDINGS of Cambridge, United Kingdom. Alternatively, the compute resources 608 can be or can include one or more hardware components architected in accordance with an x86 architecture, such an architecture available from INTEL CORPORATION of Mountain View, Calif., and others. Those skilled in the art will appreciate the implementation of the compute resources 608 can utilize various computation architectures or combinations thereof, and as such, the compute resources 608 should not be construed as being limited to any particular computation architecture or combination of computation architectures, including those explicitly disclosed herein.

The memory resource(s) 610 can include one or more hardware components that perform storage operations, including temporary or permanent storage operations. In some embodiments, the memory resource(s) 610 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 608.

The other resource(s) 612 can include any other hardware resources that can be utilized by the compute resources(s) 608 and/or the memory resource(s) 610 to perform operations described herein. The other resource(s) 612 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 614-614K (also known as "hypervisors"; hereinafter "VMMs 614") operating within the virtualization/control layer 604 to manage one or more virtual resources that reside in the virtual resource layer 606. The VMMs 614 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). It should be understood, however, that other container technologies can be used and are contemplated. In the illustrated embodiment, the virtual resource layer 606 includes VMs 616-616L (hereinafter "VMs 616"). The VMs 616 can execute instructions to provide, at least in part, any services or composition of services described herein.

Figure 7:
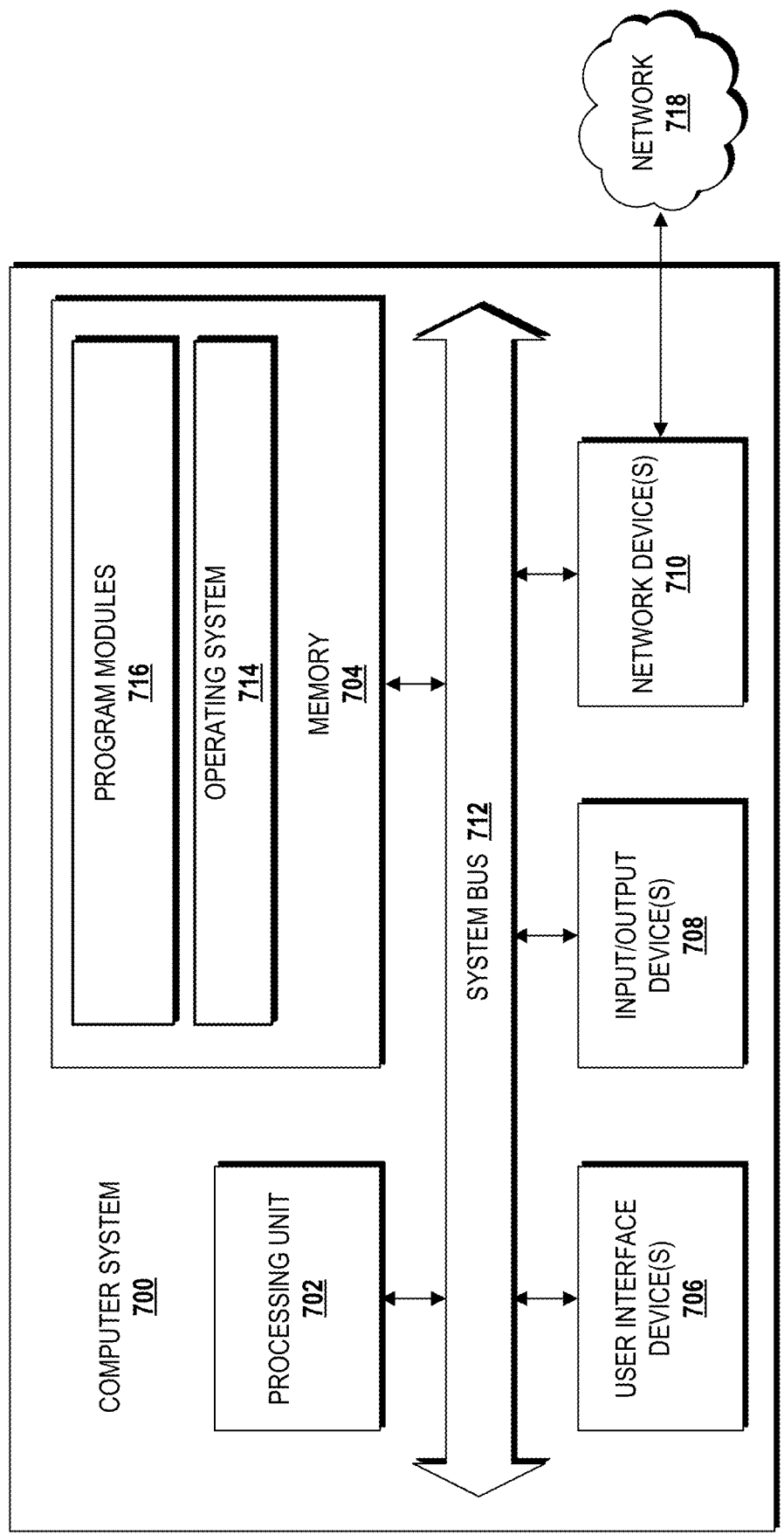
FIG. 7 is a block diagram illustrating an illustrative network virtualization platform ("NVP") capable of implementing aspects of the embodiments presented herein.

Referring now to FIG. 7, a block diagram illustrating a computer system 700 configured to provide the functionality in accordance with various embodiments of the concepts and technologies disclosed herein. In some implementations, at least a portion of the hardware resources in the hardware resource layer 602 (shown in FIG. 6) are provided, at least in part, by one or more host server computers (collectively, "host server cluster"), which is/are configured like the architecture of the computer system 700. It should be understood, however, that modification to the architecture may be made to facilitate certain interactions among elements described herein. In some implementations, the compute resources 608, the memory resources 610, and/or the other resources 612 are configured like the architecture of the computer system 700 or portions thereof. In some implementations, one or more of the systems, engines or other components introduced in the FIGURES are configured like the architecture of the computer system 700 or portions thereof.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 608 can include one or more instances of the processing units 702.

The memory 704 communicates with the processing unit 702 via the system bus 712. In some embodiments, the memory 704 is operatively connected to a memory controller (not shown) that enables communication with the processing unit 702 via the system bus 712. The memory resources 610 can include one or more instances of the memory 704. The illustrated memory 704 includes an operating system 714 and one or more program modules 716.

The operating system 714 can include the operating system 308 of the computer system 306 best shown in FIG. 3. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718, which can include an SDN network and/or other networks described herein. Examples of the network devices 710 include, but are not limited to, a modem, a radio frequency or infrared transceiver, a telephonic interface, a bridge, a router, or a network card. The network 718 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 718 may be a wired network such as, but not limited to, a wide area network ("WAN"), a wired LAN such as provided via Ethernet, a wired personal area network ("PAN"), or a wired metropolitan area network ("MAN").

Figure 8:
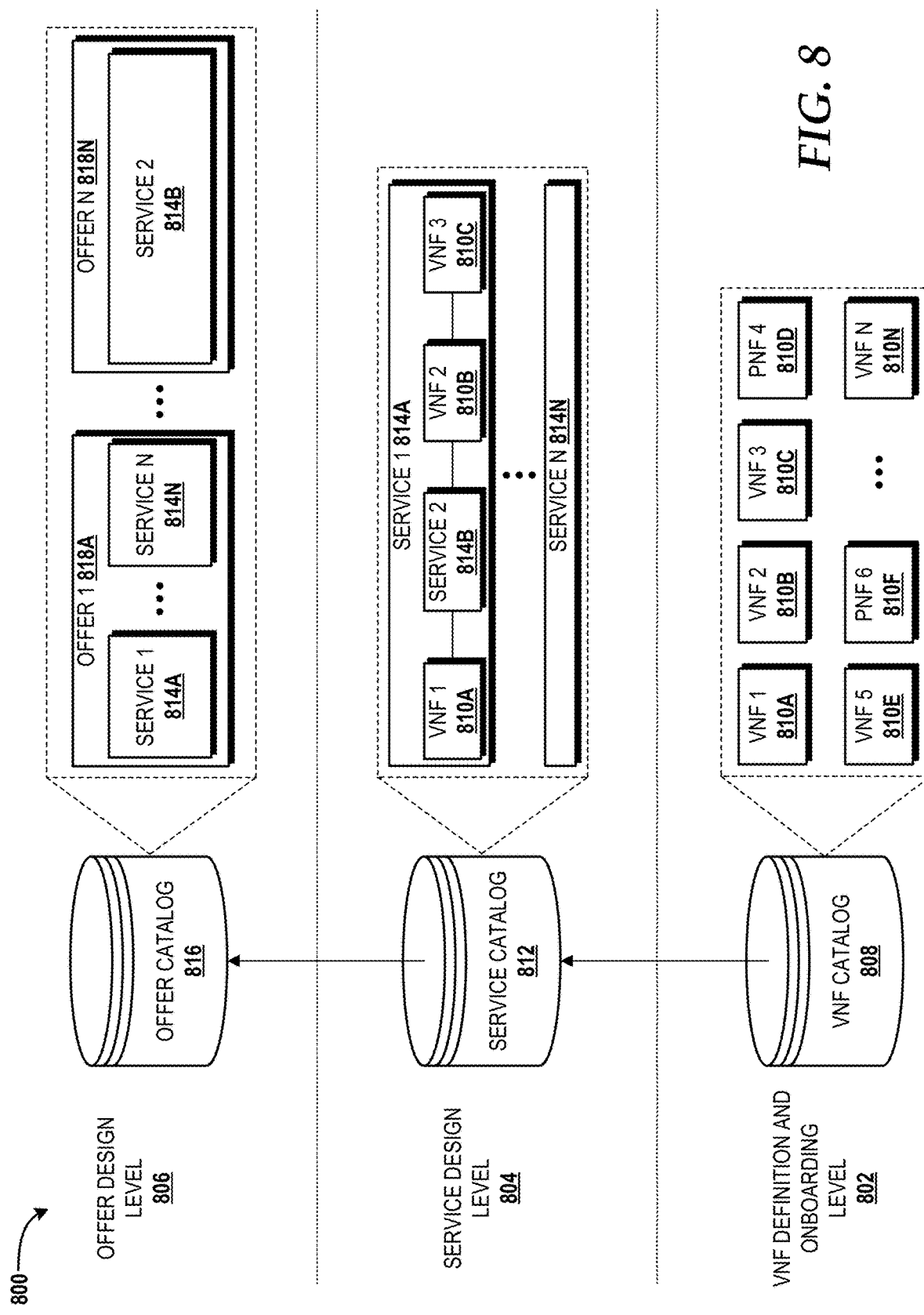
FIG. 8 is a block diagram illustrating aspects of a resource hierarchy, according to an illustrative embodiment.

Referring now to FIG. 8, a resource hierarchy 800 will be described, according to an illustrative embodiment. The illustrated resource hierarchy 800 includes a VNF definition and onboarding level 802, a service design level 804, and an offer design level 806. Each of these levels includes resources that can be utilized for service composition in accordance with the concepts and technologies disclosed herein. Each of these levels will now be described.

The VNF definition and onboarding level 802 includes a VNF catalog 808. The VNF catalog 808 contains a set of all available VNFs 810A-810N (collectively, VNFs 810). The VNFs 810 can additionally include one or more physical network functions ("PNFs"), which, from a framework software perspective, can be wrapped with interfaces that present the PNFs as VNFs. The VNFs 810 can provide fundamental network capabilities, some examples of which include, but are not limited to, firewalls, load balancers, routing elements, switching elements, combinations thereof, and the like. The VNFs 810 can support configurable attributes that affect behavior and characteristics of the VNFs 810. The VNFs 810 can conform to VNF packaging standards, including, for example, VNF recipes, VNF controller application programming interfaces ("APIs"), events, and formats. In order to improve the process of offer creation, the VNFs 810 can be packaged in a way that facilitates incorporation into one or more high-level service abstractions provided in the service design level 804, which will now be described.

The service design level 804 includes a service catalog 812. The service catalog 812 contains a set of all available services 814A-814N (collectively, services 814). As used herein, the services 814 are not customer facing offers but are instead modules that encapsulate one or more of the VNFs 810 and/or one or more other services (which can include one or more of the services 814) and facilitate the creation of customer facing offers provided in the offer design level 806. In the illustrated example of the service design level 804, a service 1 814A encapsulates a VNF 1 810A, a VNF 2 810B, a VNF 3 810C, and a service 2 814B. Although not shown, the service 2 814B might also encapsulate one or more of the VNFs 810 and/or one or more other services. The services 814 can support configurable attributes that affect behavior and characteristics of the services 814. The services 814 can conform to service packaging standards, including service recipes, service-specific APIs, events, and formats.

The highest level of resource in the resource hierarchy 800 is the offer design level 806. The offer design level 806 includes an offer catalog 816. The offer catalog 816 contains a set of all available offers 818A-818N (collectively, offers 818—also referred to herein as "products" or "product offers"). In the illustrated example of the offer design level 806, an offer 1 818A includes the service 1 814A and the service N 814N, and an offer N 818N includes the service 2 814B. The offers 818 are based on a bundle of one or more of the services 814 configured appropriately and associated with eligibility requirements, rating/pricing configurations, terms and conditions, discounts, promotions, customer experience interfaces, combinations thereof, and/or the like.

In summary, the resource hierarchy 800 includes modules that can encapsulate other modules, extending from base VNFs (e.g., the VNFs 810) to simple service modules (e.g., the service N 814N), to complex service modules that incorporate simple services and other VNFs (e.g., the service 1 814A), and then to offer modules (e.g., the offers 818). When one module encapsulates another, that module can leverage the encapsulated module's registered APIs and user interfaces ("UIs") to provide the module's own set of APIs and UIs. For example, an offer aggregating a service might use, without modification, all of the APIs of a subordinate service.

Based on the foregoing, it should be appreciated that concepts and technologies directed a sequential recommender system for virtualized network services have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
receiving, by a sequential recommender system executing within a compute cloud, a request to create a new project for a virtualized network service, wherein the virtualized network service is deployed within an autonomous services composition core that communicatively couples with the compute cloud;
in response to receiving the request, creating, by the sequential recommender system, the new project for the virtualized network service, wherein the new project for the virtualized network service defines a project name text field, a project description text field, a virtualized service query text field, and a selected virtualized services list;
receiving, by the sequential recommender system, user input regarding a virtualized network service project interest associated with the new project for the virtualized network service expressed by a user, wherein the user input is received via the project name text field, the project description text field, and the virtualized service query text field of the new project for the virtualized network service;
in response to receiving the user input, consulting, by the sequential recommender system, a knowledge base to determine a plurality of recommended virtualized network services for the new project for the virtualized network service based upon the user input regarding the virtualized network service project interest expressed by the user;
presenting, by the sequential recommender system, the plurality of recommended virtualized network services to the user, wherein the plurality of recommended virtualized network services are presented as a sequence of recommendations, and wherein the user identifies selected virtualized services that are selected from among the plurality of recommended virtualized network services;
linking the selected virtualized services together;
verifying that the selected virtualized services can be linked together;
initiating a network simulation so as to validate that the selected virtualized services are deployable using virtual network functions; and
deploying, via the compute cloud, each recommended virtualized network service belonging to the selected virtualized services by instantiating a virtual machine that hosts a virtual network function, wherein each recommended virtualized network service includes a module that encapsulates the virtual network function.

2. The method of claim 1, further comprising presenting, by the sequential recommender system, a recommender graphical user interface that comprises the project name text field, the project description text field, the virtualized service query text field, and the selected virtualized services list, wherein each of the plurality of recommended virtualized network services is presented to the user via the recommender graphical user interface.

3. The method of claim 2, wherein presenting, by the sequential recommender system, the recommender graphical user interface comprises presenting, by the sequential recommender system, the recommender graphical user interface via a browser-based graphical user interface.

4. The method of claim 1, wherein the sequence of recommendations is provided in response to updating of the user input, wherein the plurality of recommended virtualized network services comprises a recommended virtualized network service, and wherein the recommended virtualized network service corresponds with at least one of a switched ethernet service, a data splitter service, an anomaly detection service, or a data archiving service.

5. The method of claim 4, further comprising assigning, by the sequential recommender system, a recommendation score to each of the plurality of recommended virtualized network services.

6. The method of claim 5, further comprising ranking, by the sequential recommender system, the plurality of recommended virtualized network services in accordance with recommendation scores assigned thereto.

7. The method of claim 6, further comprising generating, by the sequential recommender system, a ranked list of the plurality of recommended virtualized network services based upon the recommendation scores, wherein presenting, by the sequential recommender system, the plurality of recommended virtualized network services to the user comprises presenting, by the sequential recommender system, the ranked list of the plurality of recommended virtualized network services to the user.

8. A sequential recommender system for virtualized network services within a compute cloud, the sequential recommender system comprising:
a processor; and
a memory that stores instructions that, when executed by the processor, cause the processor to perform operations comprising:
receiving a request to create a new project for a virtualized network service, wherein the virtualized network service is deployed within an autonomous services composition core that communicatively couples with the compute cloud,
in response to receiving the request, creating the new project for the virtualized network service, wherein the new project for the virtualized network service defines a project name text field, a project description text field, a virtualized service query text field, and a selected virtualized services list,
receiving user input regarding a virtualized network service project interest associated with the new project for the virtualized network service expressed by a user, wherein the user input is received via the project name text field, the project description text field, and the virtualized service query text field of the new project for the virtualized network service,
in response to receiving the user input, consulting a knowledge base to determine a plurality of recommended virtualized network services for the new project for the virtualized network service based upon the user input regarding the virtualized network service project interest expressed by the user,
presenting the plurality of recommended virtualized network services to the user, wherein the plurality of recommended virtualized network services are presented as a sequence of recommendations, and wherein the user identifies selected virtualized services that are selected from among the plurality of recommended virtualized network services,
linking the selected virtualized services together,
verifying that the selected virtualized services can be linked together,
initiating a network simulation so as to validate that the selected virtualized services are deployable using virtual network functions, and
deploying each recommended virtualized network service belonging to the selected virtualized services by instantiating a virtual machine that hosts a virtual network function, wherein each recommended virtualized network service includes a module that encapsulates the virtual network function.

9. The sequential recommender system of claim 8, wherein the operations further comprise presenting a recommender graphical user interface that comprises the project name text field, the project description text field, the virtualized service query text field, and the selected virtualized services list, wherein each of the plurality of recommended virtualized network services is presented to the user via the recommender graphical user interface.

10. The sequential recommender system of claim 9, wherein presenting the recommender graphical user interface comprises presenting the recommender graphical user interface via a browser-based graphical user interface.

11. The sequential recommender system of claim 8, wherein the sequence of recommendations is provided in response to updating of the user input, wherein the plurality of recommended virtualized network services comprises a recommended virtualized network service, and wherein the recommended virtualized network service corresponds with at least one of a switched ethernet service, a data splitter service, an anomaly detection service, or a data archiving service.

12. The sequential recommender system of claim 11, wherein the operations further comprise assigning a recommendation score to each of the plurality of recommended virtualized network services.

13. The sequential recommender system of claim 12, wherein the operations further comprise ranking the plurality of recommended virtualized network services in accordance with recommendation scores assigned thereto.

14. The sequential recommender system of claim 13, wherein the operations further comprise generating a ranked list of the plurality of recommended virtualized network services based upon the recommendation scores, wherein presenting the plurality of recommended virtualized network services to the user comprises presenting the ranked list of the plurality of recommended virtualized network services to the user.

15. A computer storage medium comprising computer-executable instructions that, when executed by a sequential recommender system for virtualized network services within a compute cloud, cause the sequential recommender system to perform operations comprising:
receiving a request to create a new project for a virtualized network service, wherein the virtualized network service is deployed within an autonomous services composition core that communicatively couples with the compute cloud;
in response to receiving the request, creating the new project for the virtualized network service, wherein the new project for the virtualized network service defines a project name text field, a project description text field, a virtualized service query text field, and a selected virtualized services list;
receiving user input regarding a virtualized network service project interest associated with the new project for the virtualized network service expressed by a user, wherein the user input is received via the project name text field, the project description text field, and the virtualized service query text field of the new project for the virtualized network service;

in response to the user input, consulting a knowledge base to determine a plurality of recommended virtualized network services for the new project for the virtualized network service based upon the user input regarding the virtualized network service project interest expressed by the user, wherein the recommended virtualized network service corresponds with at least one of a switched ethernet service, a data splitter service, an anomaly detection service, or a data archiving service;

presenting the plurality of recommended virtualized network services to the user, wherein the plurality of recommended virtualized network services are presented as a sequence of recommendations, and wherein the user identifies selected virtualized services that are selected from among the plurality of recommended virtualized network services;

linking the selected virtualized services together;

verifying that the selected virtualized services can be linked together;

initiating a network simulation so as to validate that the selected virtualized services are deployable using virtual network functions; and deploying each recommended virtualized network service belonging to the selected virtualized services by instantiating a virtual machine that hosts a virtual network function, wherein each recommended virtualized network service includes a module that encapsulates the virtual network function.

16. The computer storage medium of claim 15, wherein the operations further comprise presenting a recommender graphical user interface that comprises the project name text field, the project description text field, the virtualized service query text field, and the selected virtualized services list, wherein each of the plurality of recommended virtualized network services is presented to the user via the recommender graphical user interface.

17. The computer storage medium of claim 15, wherein the sequence of recommendations is provided in response to updating of the user input, wherein the plurality of recommended virtualized network services comprises a recommended virtualized network service.

18. The computer storage medium of claim 17, wherein the operations further comprise assigning a recommendation score to each of the plurality of recommended virtualized network services.

19. The computer storage medium of claim 18, wherein the operations further comprise ranking the plurality of recommended virtualized network services in accordance with recommendation scores assigned thereto.

20. The computer storage medium of claim 19, wherein the operations further comprise generating a ranked list of the plurality of recommended virtualized network services based upon the recommendation scores, wherein presenting the plurality of recommended virtualized network services to the user comprises presenting the ranked list of the plurality of recommended virtualized network services to the user.

* * * * *